Patented June 30, 1936

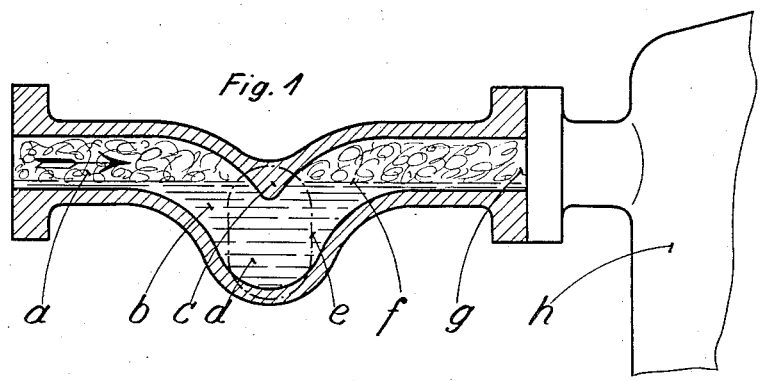
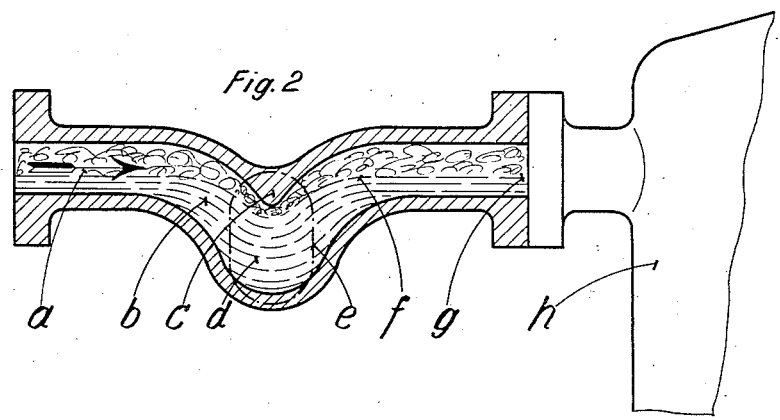

2,046,113

UNITED STATES PATENT OFFICE 2,046,113

FLUID FLOW INDICATOR FOR STEAM TRAPS

Gustav Friedrich Gerdts, Bremen, Germany

Application August 24, 1934, Serial No. 741,291
In Germany December 23, 1933

2 Claims. (Cl. 116—117)

The present invention relates in the first place to apparatus by means of which the escape of steam can be ascertained through observation during operation.

The proper function of a steam trap, especially of the type having movable parts, is not infrequently interfered with through the detrimental action of mud, or the like and by the improper seating of the operating members therein.

Such interferences very often cause water hammer, choking and most of all incessant steam losses. It is therefore very desirable, indeed essential, to be able to observe and thereby control the performance of a steam trap which so far has been accomplished only quite ineffectively and insufficiently, for instance, through opening the casing, after first having disconnected the same, a matter requiring however more time and effort than a good many attendants are ready to bestow on this work as often as advisable.

Endeavors have also been made to observe the performance of steam traps during operation through windows placed in the pipe line, but on the outflow side of the trap, with an equally unsatisfactory result in practice, as by this means only a stream of condensate and steam could be discerned intermingled to an extent making it out of question to anywhere correctly determine the relative quantity of steam passing through if any at all.

Besides, even should the passage of steam be discernable, this could not be conclusive evidence of the trap functioning rationally and satisfactorily. The condensate in the steam trap is under high pressure and correspondingly highly heated so that when flowing out of the trap into the discharge pipe line, or into the atmosphere at a temperature of say 160° C. obviously the temperature of the water of condensation drops then immediately to 100°, as is well understood.

The condensate in consequence becomes vapor again in the discharge pipe line, often to a considerable degree and the vapor when issuing naturally appears then to the eye, deceivingly, to be live steam escaping through the trap. For this reason it is quite impossible to ascertain through the observation windows on the outflow side so far in use whether live steam is blowing through or re-vaporized condensate.

These fundamental short-comings of the known controlling devices for steam traps are entirely avoided according to the invention in an exceedingly simple way, mainly by placing the device with the observation window not adjacent and opposite the outflow—but adjacent and facing the inlet opening of the trap in such a manner that condensate and vapor pass by the window in clearly discernable separate streams.

As a matter of fact only condensate the surface of which has been downwardly deflected in the intermediate passage by flowing live steam can then be seen through the windows arranged according to the invention, for the simple reason that steam or vapor can only form out of the condensate whilst its pressure is reduced, i. e. during its passage out of the trap, thus, never within the trap or in the passage of the device leading to the trap.

The arrangement of passages and parts of the new controlling device on the inflowing side and the constructional features which make steam and water clearly discernable in separate streams entirely avoid all deceptions and infallibly indicates the conditions within the trap exactly as they are.

In the accompanying drawing,

Fig. 1 is a sectional view of the new device.

Fig. 2 is a sectional view.

The condensate enters casing $b$ of the new controlling device together with any steam and passes out into steam trap $h$ at $g$. The separation of steam and condensate occurs according to the invention in and above pocket $d$, a rib, as $c$, extending across the passage between openings $a$ and $g$ and also downwardly into pocket $d$ so that the latter is always entirely filled with water as long as there is no steam entering, regardless of whether more or less or no condensate at all is passing through.

In this case of course only water can be seen through the observation glasses or windows $e$, see Figs. 1 and 2. However, as soon as steam begins to flow towards the steam trap, being specifically so much lighter than water, it is compelled to pass below ridge $c$, see Fig. 2, the more steam passing through the less water is visible in the window.

The glass of the window may also be ribbed suitably where it is desirable to obtain a more or less magnified view of the changes of the water level in the passage.

Not only is it possible to ascertain any passage of steam, but the quantity flowing through may be judged fairly well from the extent to which the stream of water is pressed down and thereby the area of flow is reduced by the steam.

To assure an even linear flow, without whirls and eddies, so that steam and water may flow separately and without mingling, the passage must of course be of ample diameter. It is furthermore important that, as shown in Fig. 1, the steam retained in the passage be not visible, so that only flowing steam becomes apparent, Fig. 2.

Having thus described my invention, what I claim as new, and desire to secure by Letters Patent, is—

1. A device comprising a member having a pocket intermediate its ends and an inlet and an outlet passage communicating with said pocket, said passages and pocket forming a continuous channel for conducting steam and condensate toward a trap, a window in a wall of said pocket and having graduations arranged thereon, and a rib projecting from a wall of said channel into said pocket to such a position as to cause flowing steam to depress the condensate to an extent measurable against the graduations on the glass.

2. A device comprising a member having a pocket intermediate its ends and an inlet and an outlet passage communicating with said pocket, said pocket and passages forming a continuous channel for conducting steam and condensate toward a trap, a pair of oppositely disposed windows having graduations thereon and arranged in the walls of said pocket and a rib projecting from a wall of said channel into said pocket and between said windows to such a position as to cause flowing steam to depress condensate in said pocket to an extent measurable against the graduations on said windows.

GUSTAV FRIEDRICH GERDTS.